(12) United States Patent
Sorenson

(10) Patent No.: US 10,588,458 B1
(45) Date of Patent: Mar. 17, 2020

(54) TOOL FOR CLEANING COOKING GRATES

(71) Applicant: Adam Sorenson, Lake Preston, SD (US)

(72) Inventor: Adam Sorenson, Lake Preston, SD (US)

(*) Notice: Subject to any disclaimer, the term of this patent is extended or adjusted under 35 U.S.C. 154(b) by 1009 days.

(21) Appl. No.: 14/205,795

(22) Filed: Mar. 12, 2014

Related U.S. Application Data

(60) Provisional application No. 61/783,849, filed on Mar. 14, 2013.

(51) Int. Cl.
A47L 13/08 (2006.01)
A47L 17/00 (2006.01)
A47J 37/07 (2006.01)

(52) U.S. Cl.
CPC .......... A47J 37/0786 (2013.01); A47L 13/08 (2013.01); A47L 17/00 (2013.01)

(58) Field of Classification Search
CPC .......... A47L 13/08; A47L 17/00; A47L 13/12; A47L 17/06; A46B 2200/3033; B08B 1/00
USPC .............. 15/236.09, 236.06, 236.07, 236.01
See application file for complete search history.

(56) References Cited

U.S. PATENT DOCUMENTS

| 804,921 | A | | 11/1905 | Blackburn |
| 2,824,323 | A | | 2/1958 | Tos |
| 3,432,871 | A | | 3/1969 | Caprioli |
| 3,487,491 | A | | 1/1970 | Dunn |
| 3,719,993 | A | * | 3/1973 | Caprioli ................. B23D 79/08 15/104.04 |
| 3,820,185 | A | * | 6/1974 | Phillips ............... A47J 37/0786 15/105 |
| 4,365,380 | A | | 12/1982 | Fassler |
| 4,958,403 | A | * | 9/1990 | Martin .................... A47L 17/06 15/104.04 |
| 5,373,600 | A | | 12/1994 | Stojanovski |
| D377,251 | S | * | 1/1997 | Mitchell ........................ D32/49 |
| 6,000,739 | A | * | 12/1999 | Zemit ..................... A47J 45/10 126/25 R |
| D422,766 | S | | 4/2000 | Whitman |
| 7,168,124 | B2 | | 1/2007 | Dalias |
| D677,847 | S | * | 3/2013 | Thompson .................... D32/46 |
| 2005/0160544 | A1 | | 7/2005 | Geller |
| 2009/0188061 | A1 | | 7/2009 | Cybulski |
| 2009/0217471 | A1 | | 9/2009 | Weingerger |

* cited by examiner

Primary Examiner — Randall E Chin
(74) Attorney, Agent, or Firm — Jeffrey A. Proehl; Woods, Fuller, Schultz & Smith, PC

(57) ABSTRACT

A tool for cleaning cooking grates having grate members may comprise a plate having a primary side with a primary side edge. The tool may include a plurality of elongated primary scraping slots formed in the plate. The scraping slots have closed opposite ends formed by end edge portions and sides. A plurality of auxiliary entry slots may be configured to permit movement of grate members into the scraping slots, with an entry slot being associated with each primary scraping slot. At least one of the entry slots may be in communication with a scraping slot and the primary side, and may intersect a primary slot on one side of the scraping slot. The end edge portions may be similarly shaped such that each end edge portion is able to scrape an opposite surface of the grate members without removing the grate member from the scraping slot.

9 Claims, 11 Drawing Sheets

TOOL FOR CLEANING COOKING GRATES

REFERENCE TO RELATED APPLICATIONS

This application claims the benefit of U.S. Provisional Patent Application No. 61/783,849, filed Mar. 14, 2013, which is hereby incorporated by reference in its entirety.

BACKGROUND

Field

The present disclosure relates to grill tools and more particularly pertains to a new tool for cleaning cooking grates in a more efficient manner.

Description of the Prior Art

Cooking grills are popular for cooking food items, but the food cooked on the grates of the grill tend to leave residue on the members that make up the grate, and removal of the residue is often made more difficult to remove by the intense heat of the grill environment that tends to "bake" the residue on the grate surfaces. Some people attempt to clean the grates by burning the residue off by turning the heat up to the highest setting (especially on gas-fueled grills), while others remove and wash the grates, and still others scour the grates in place with a wire-bristled brush. However, using wire brushes to clean grates may allow bristles to break free from the brush handle, and if unnoticed may stick to the grate members may then become stuck in or on food subsequently cooked on the grill. If ingested the bristles may lodge in a person's digestive system and cause severe medical problems.

SUMMARY

In one aspect, the present disclosure relates to a tool for cleaning cooking grates, with the cooking grates including a plurality of substantially parallel grate members. The tool may comprise a plate having sides and an edge extending along each of the sides, with the sides including a primary side with a primary side edge. The tool may include a plurality of elongated primary scraping slots formed in the plate, and the scraping slots may be formed by the primary edge and may have opposite ends. The opposite ends may be closed, and each of the scraping slots may include end edge portions forming the ends of the scraping slots. Each of the scraping slots may have side edge portions forming sides of the scraping slots. A plurality of auxiliary entry slots may be configured to permit movement of grate members into the primary scraping slots. A said entry slot may be associated with each of the primary scraping slots, with at least one of the entry slots being in communication with a said scraping slot and the primary side. A said entry slot may intersect a said primary slot on one said side of the scraping slot. The end edge portions of the primary scraping slots may be similarly shaped such that each end edge portion is able to scrape an opposite surface of the grate members without removing the grate member from the primary scraping slot.

In another aspect, the disclosure also relates to a system that may include a cooking grate including a plurality of substantially parallel grate members, with each of the grate members having a substantially circular cross sectional shape. The system may also include a tool for cleaning the grate members of the cooking grate, and may comprise a plate having sides and an edge extending along each of the sides. The sides may include a primary side with a primary side edge, with portions of the primary side edge being substantially aligned along a primary extent. The tool may include a plurality of elongated primary scraping slots formed in the plate, with the scraping slots being formed by the primary edge. The scraping slots may have opposite ends, with the opposite ends being closed. Each of the scraping slots may include end edge portions forming the ends of the scraping slots, with each of the scraping slots having side edge portions forming sides of the scraping slots. A width of the primary scraping slot may be defined between the side edge portions. A plurality of auxiliary entry slots may be configured to permit movement of grate members into the primary scraping slots, with a said entry slot being associated with each of the primary scraping slots. At least one of the entry slots may be in communication with a said scraping slot and the primary side, with a said entry slot intersecting a said primary slot on one said side of the scraping slot. The end edge portions of the primary scraping slots may be substantially semicircular in shape in opposition to each other such that each end edge portion is able to scrape an opposite surface of the grate member without removing the grate member from a said primary scraping slot.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
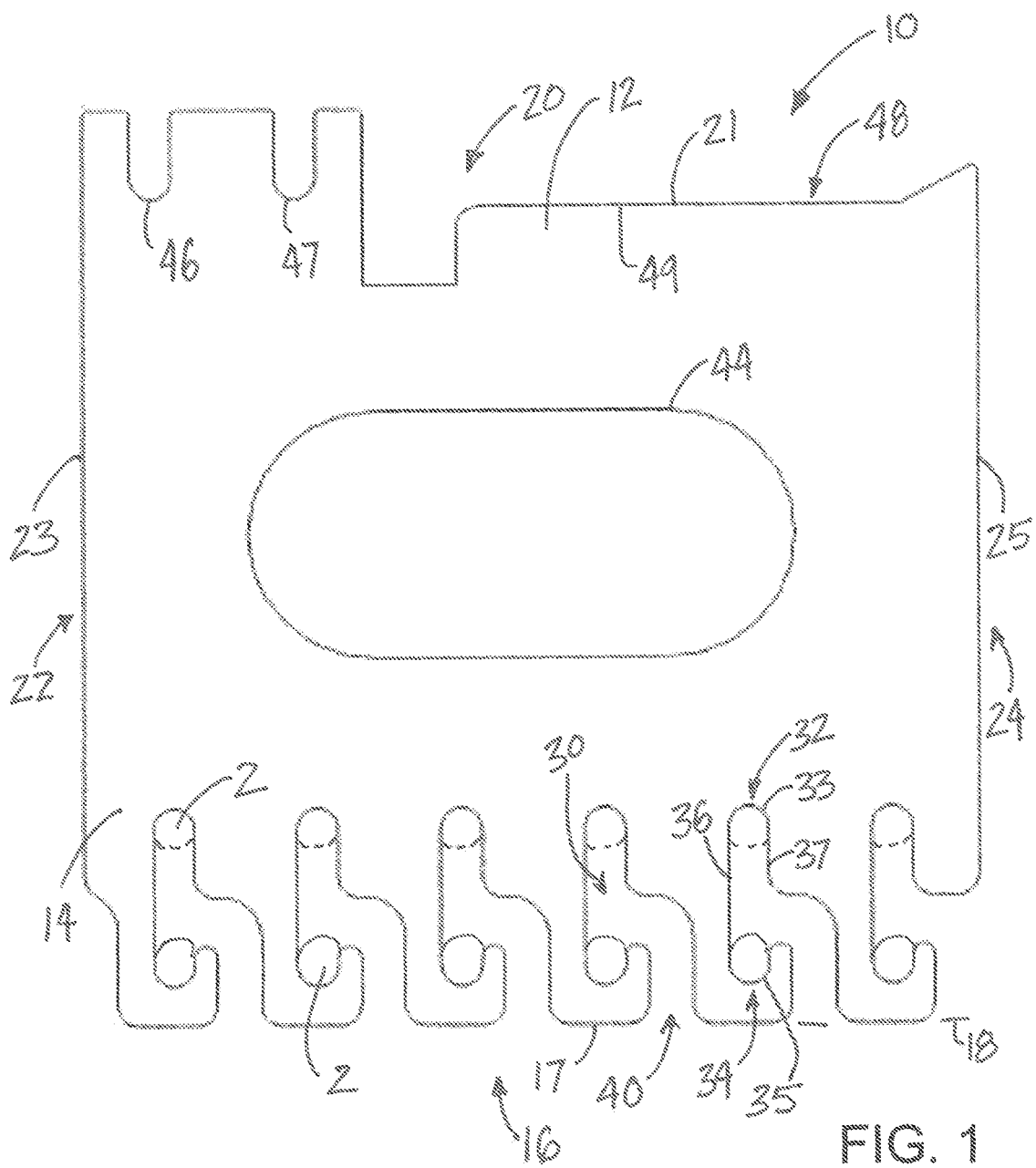
FIG. 1 is a schematic front view of an illustrative embodiment of a new tool for cleaning cooking grates according to the present disclosure.
Figure 2:
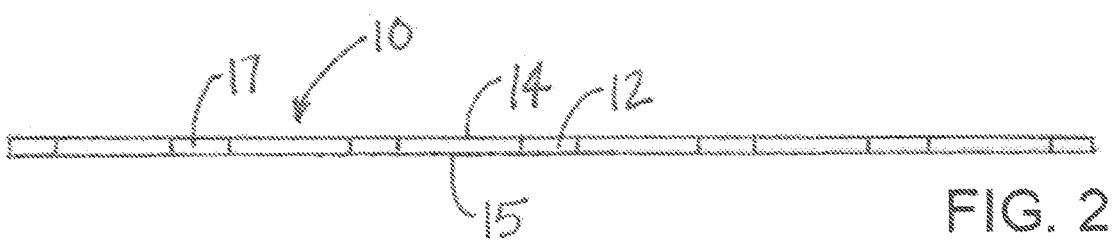
FIG. 2 is a schematic edge view of the plate of the tool, according to the illustrative embodiment of FIG. 1.
Figure 3A:
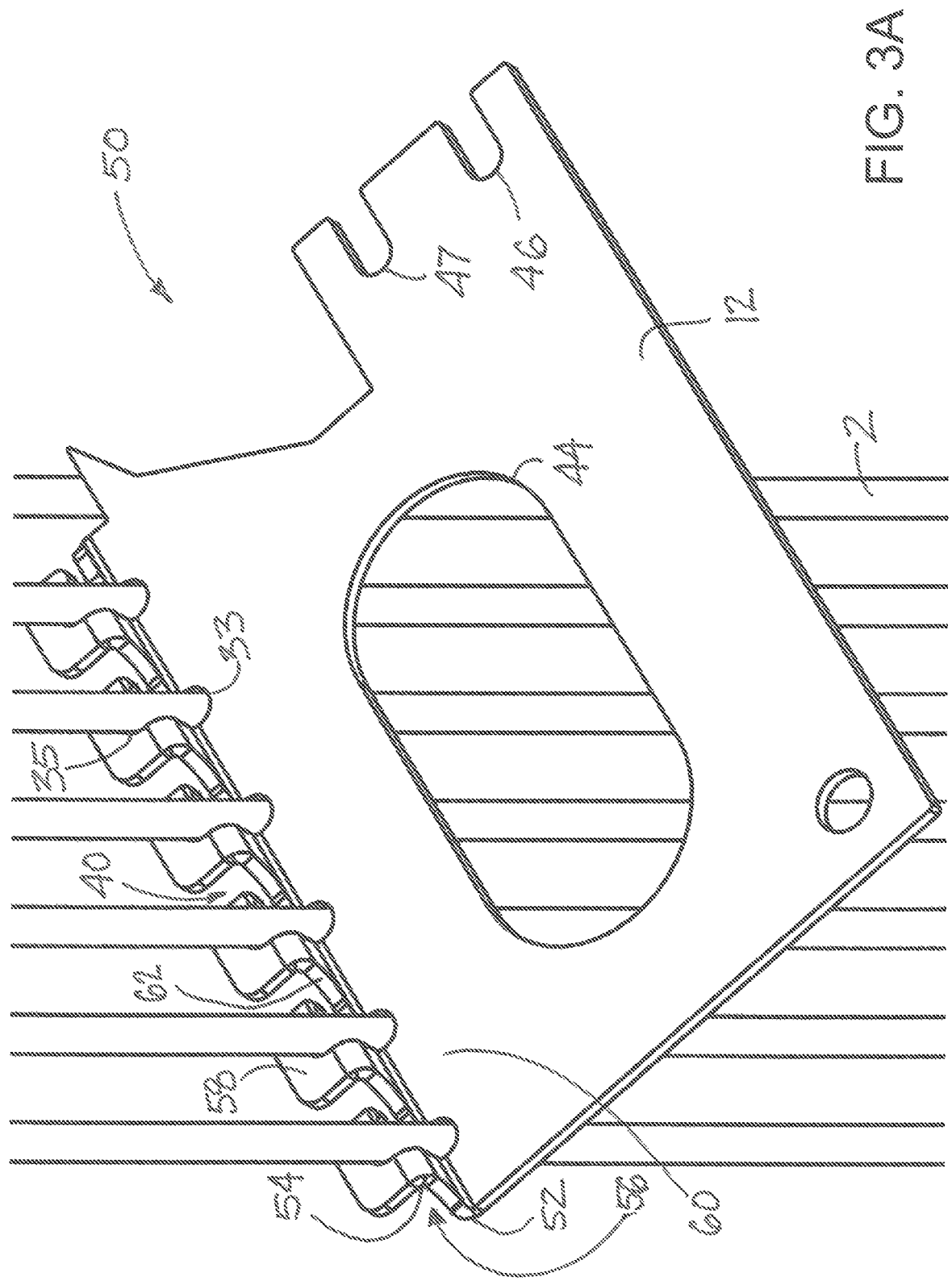
FIG. 3A is a schematic perspective view of another illustrative embodiment of the tool for cleaning cooking grates according to the present disclosure.
Figure 3B:
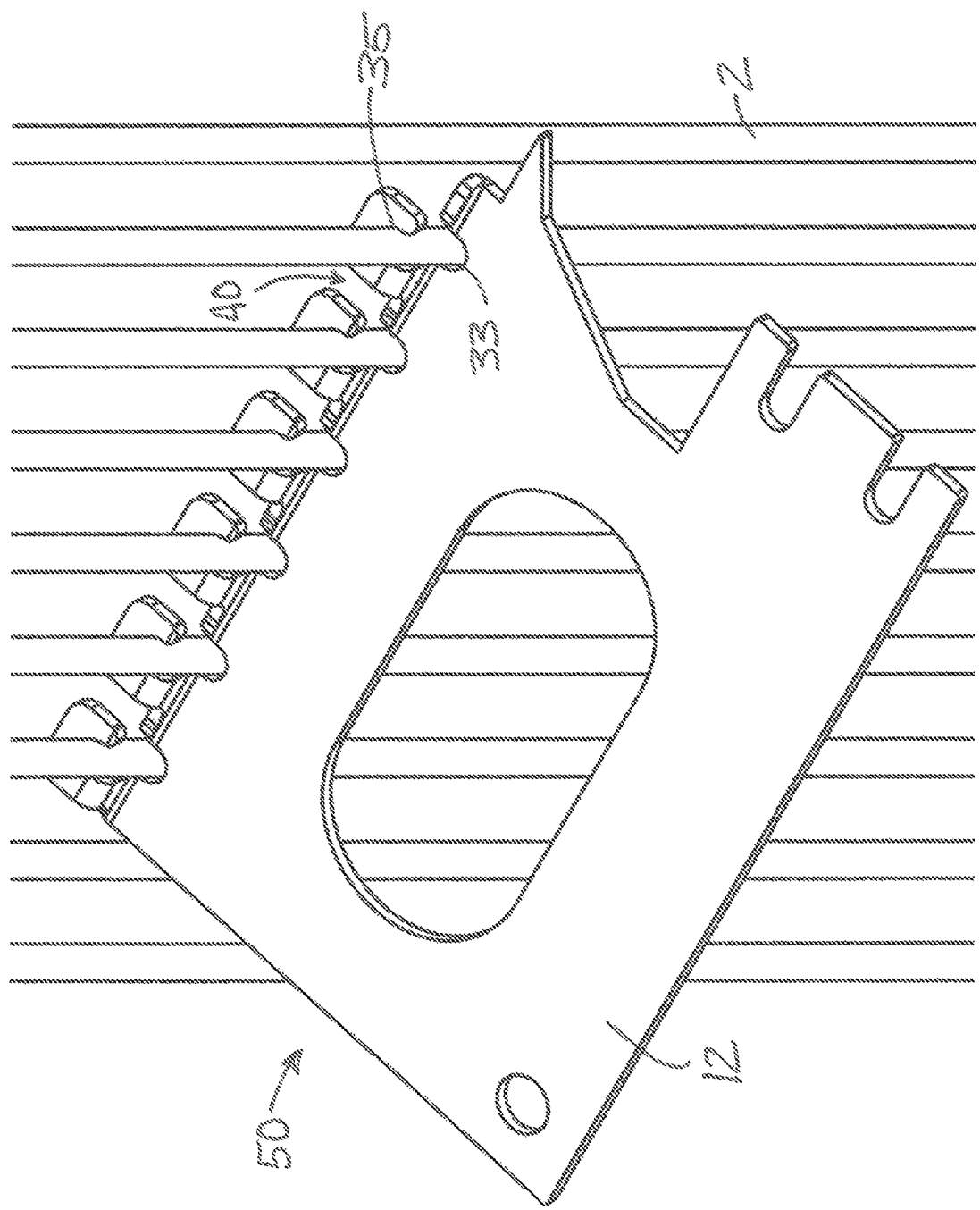
FIG. 3B is a schematic perspective view of the illustrative embodiment of the tool of FIG. 3A shown from another side.
Figure 4:
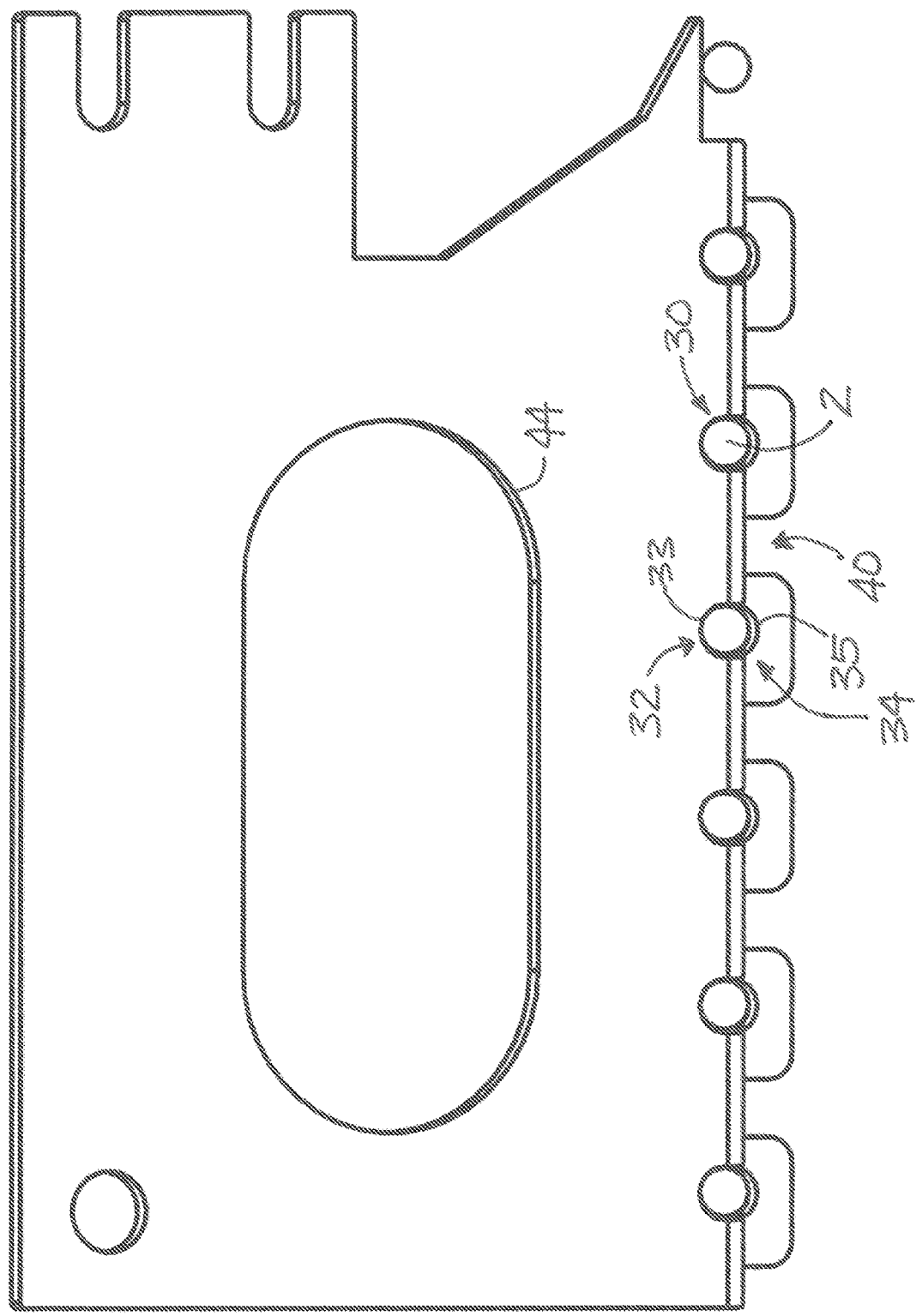
FIG. 4 is a front view of the illustrative embodiment of the tool of FIG. 3 shown with the tool tilted to fully engage the grill members.
Figure 5:
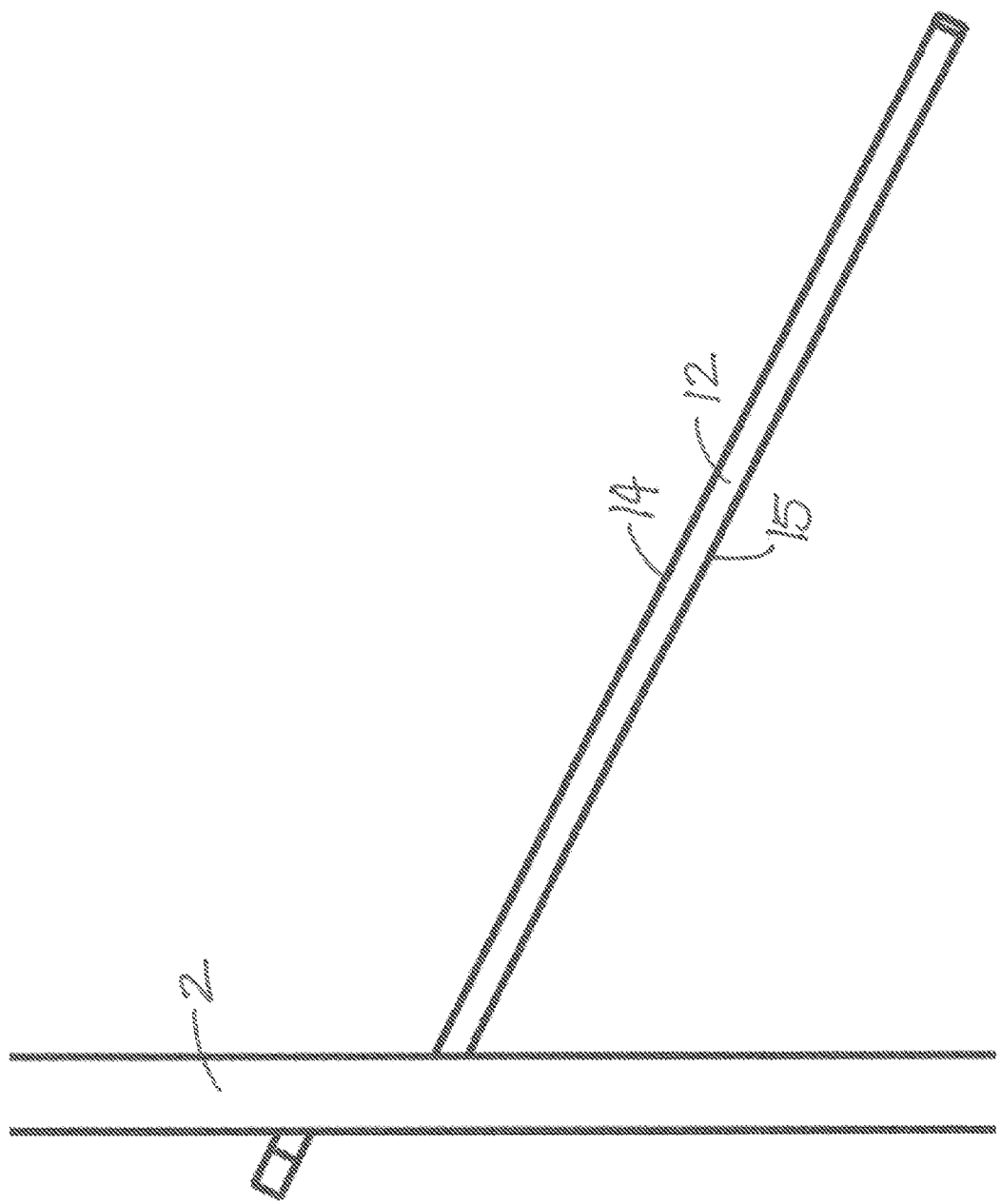
FIG. 5 is a schematic side edge view of the illustrative embodiment of the tool of FIG. 3.
Figure 6:
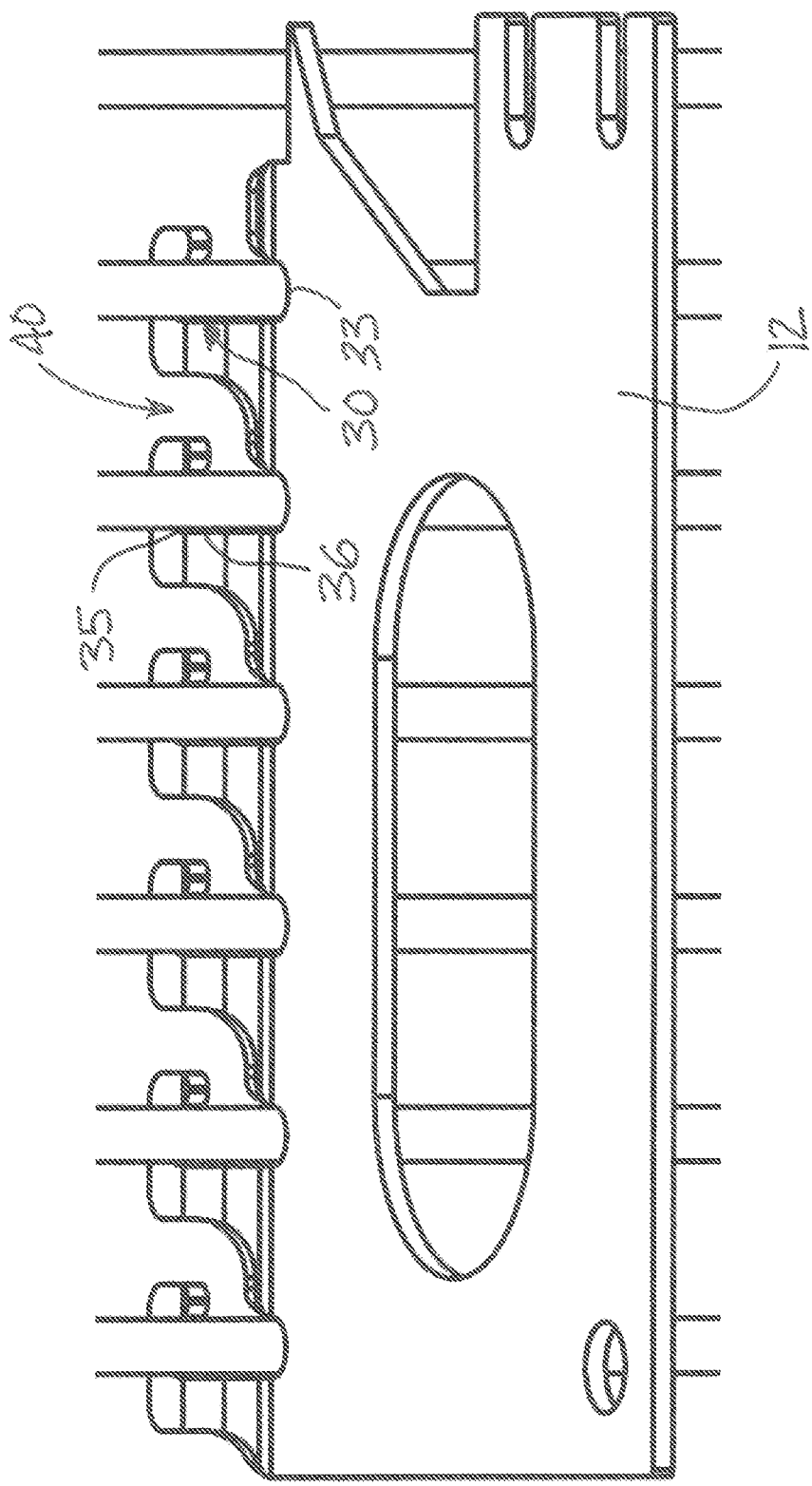
FIG. 6 is a top view of the illustrative embodiment of the tool of FIG. 3 shown with the tool tilted to fully engage the grill members.
Figure 7:
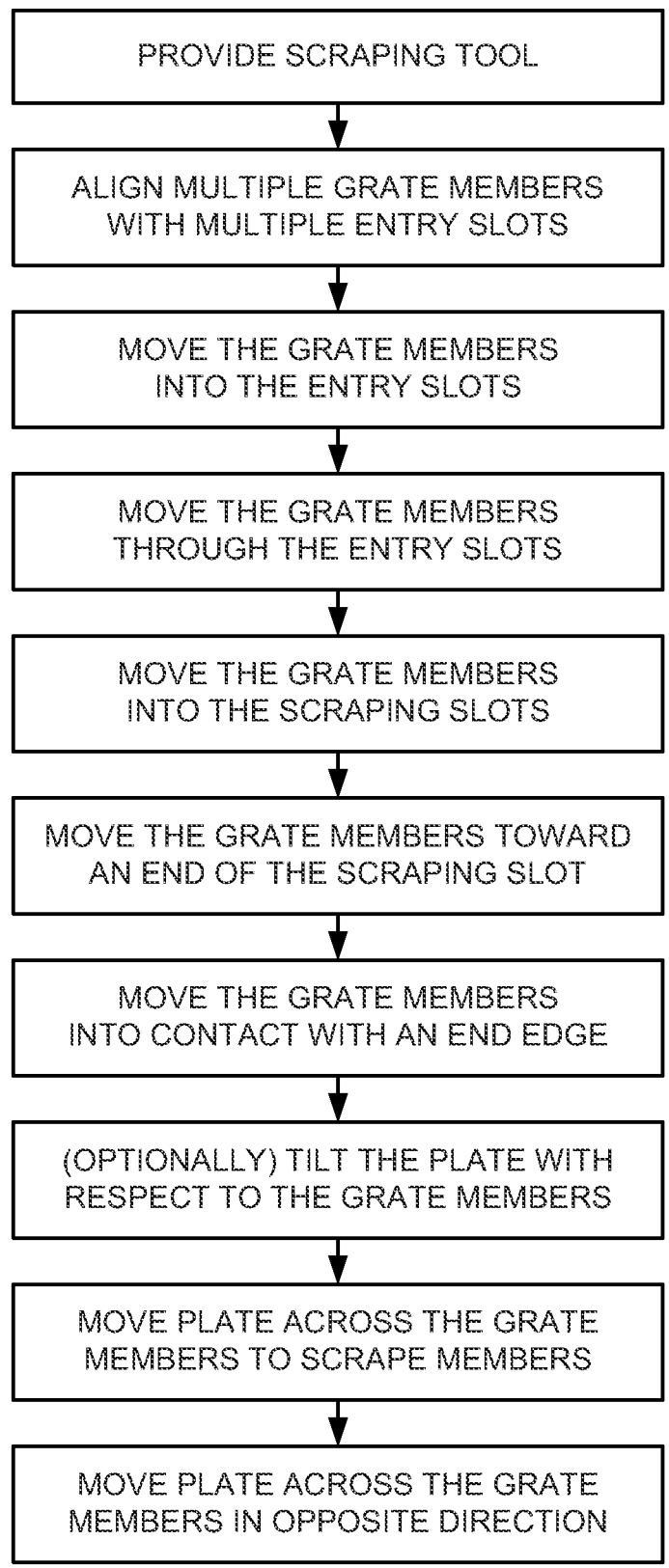
FIG. 7 is a schematic diagram of a method of using the tool, according to an illustrative implementation.

With reference now to the drawings, and in particular to FIGS. 1 through 12 thereof, a new tool for cleaning cooking grates embodying the principles and concepts of the disclosed subject matter will be described.

Applicant has recognized that due to the difficulty and tediousness of cleaning the grate members of the grill grate, many grill owners do not bother getting their grates perfectly clean with a bristled brush and sometimes utilize wasteful options such as burning the residue off using high heat. Applicant has also recognized that while scrapers exist for grates, the known scrapers are typically unable to scrape more than about one half of the cross sectional surface of the grate member before having to be removed and repositioned on the grate members, and typically are unable to scrape more than one or possibly two grate members in a single pass of the scraper over the grate.

Applicant believes that it would be desirable to be able to scrape substantially the entire cross sectional surface of multiple grate members without having to remove the scraping device from the grate to provide more efficient and quicker grate cleaning than the known grill cleaning tools, while also avoiding the possibility of leaving shards of wire on the grill or wasting energy.

In general, applicant has devised a grate-scraper tool to simultaneously contact and scrape the top and sides of multiple grate members of a grate with a single pass and to simultaneously scrape the bottom and the sides of the same grate members with a second pass, without the need to remove the tool from the grates, and preferably without having to remove the grate from the grill. Illustratively, with each pass, approximately 50% to approximately 75% of each grates member's cross sectional or perimeter surface can be cleaned, and with two passes, the entirety or substantially the entirety of the cross sectional surface may be cleaned.

In one aspect, the disclosure is directed to a tool 10 for cleaning cooking grates used on grilling apparatus, which may be fuel-fired or an electrical grill such as is disclosed in U.S. Pat. No. 7,339,137 of which the applicant is a co-inventor. Suitable cooking grates may include a plurality of substantially parallel grate members 2 that may extend from one side of the grate to an opposite side of the grate. In some grates, the grate members 2 may comprise rods which have substantially circular cross sectional shape, and in other illustrative grates, the rods may have a substantially rectangular or polygonal cross sectional shape. Advantageously, the tool may also be highly useful for engaging and lifting and moving grill grates to and from the grill, especially when the grates are (or may be) hot.

The tool 10 may comprise a plate 12 which may have opposite faces 14, 15 which may be substantially flat and may extend substantially parallel to each other. The plate 12 may have a plurality of sides, with an edge extending along each of the sides. In some embodiments, the plate 12 may have four sides, and may include a primary side 16 with a primary side edge 17. Portions of the primary side edge being substantially aligned along a primary extent 18. The plate may also include a secondary side 20 with a secondary side edge 21 located on an opposite side of the plate from the primary side 16 and primary side edge 17. The sides of the plate may also include auxiliary sides 22, 24 with respective auxiliary side edges 23, 25. The auxiliary sides 22, 24 may extend between the primary 16 and secondary sides 20, and may be positioned on opposite sides on the plate. In some embodiments, the auxiliary side edges may be substantially linear 23, 25.

The tool may also include a plurality of elongated primary scraping slots 30 that are formed in the plate 12. The scraping slots 30 may be formed by the primary side edge 17. The scraping slots 30 may have opposite ends 32, 34. The opposite ends may be closed, and may be formed by end edge portions 33, 35. The end edge portions of the primary scraping slots may be similarly shaped such that each end edge portion is able to scrape an opposite surface of the grate members without removing the grate member from the primary scraping slot. Illustratively, the end edge portions may have a semi-circular shape for accommodate rods with round cross sectional shapes, and may have linear portions to accommodate grate members with polygonal cross sectional shapes. For example, grate members that have a polygonal shape, such as a trapezoidal, may utilize end edge portions that are straight and may intersect at corners that may or may not have a radius.

Each of the scraping slots 30 may have side edge portions 36, 37 that form sides of the slots 30. The side edge portions 36, 37 of a primary scraping slot may be oriented substantially parallel to each other, and may define a width of the slot 30. The scraping slots 30 may be oriented substantially parallel to each other, and may be positioned adjacent to, but spaced from, the primary extent 18. Each of the scraping slots 30 may have a longitudinal axis that is oriented substantially perpendicular to the primary extent 18. The width of the primary slots 30 may be formed to be slightly greater than a width of the grate rods that are intended to be scraped by the tool 10.

In some of the most preferred embodiments, the scraping slots 30 may be in communication with the primary side 16 so that the rods may enter the primary scraping slots 30 from the primary side 16. The plate may include a plurality of auxiliary entry slots 40 that may be configured to permit movement of grate members 2 into and out of the primary scraping slots 30. An entry slot 40 may be associated with each of the primary scraping slots 30, and may be in communication with the scraping slot and the primary side 16. An entry slot may intersect one of the primary scraping slots on one of the sides of the scraping slot so that the end edge portions of the ends of the scraping slot are maintained in a closed condition. The entry slots 40 may have a width that is relatively larger than the width of the scraping slot to enhance the ease of moving the rods into and out of the scraping slots. In some embodiments, at least one of the entry slots 40 may extend from one of the auxiliary side edges of one of the auxiliary sides to the respective primary scraping slot.

The plate may also have a gripping aperture 44 that is formed in the plate and may be configured to receive a portion of a hand of the user. The gripping aperture 44 may be positioned medial of the primary 16 and secondary 20 sides of the plate. The gripping aperture may be elongated, and may have a longitudinal axis that is oriented substantially parallel to the secondary side 20.

At least one secondary scraping slot 46 may also be included in the plate 12, and may be located at the secondary side 20. The secondary scraping slot 44 may extend inwardly from the secondary side 20, and may be formed by the secondary side edge. In some embodiments, the plate includes a pair of secondary scraping slots 46, 47 for concentrating scraping force on fewer grate members to remove sticky, tough, or otherwise difficult residues.

The plate 12 may also include a secondary scraping contour 48 that is configured to scrape a surface, such as a surface of a grill that is not one of the grates. The secondary scraping contour 48 may be positioned along the secondary side 20, and may be formed by the second side edge 21. The secondary scraping contour may include a linear portion 49 of the secondary side edge 21. The linear portion 49 may be oriented being substantially parallel to the secondary side 20. The secondary scraping contour may be useful, for example, for scraping walls, element shields, heat shields, drip pans, smoker trays, and the like.

In use, the plate 12 of the tool 10 may be oriented substantially perpendicular to the plane defined by the plurality of grate members, with the primary side adjacent to the grate members. Each grate member may be aligned with one of the auxiliary entry slots 40, and the grate members may be moved into the aligned entry slots 40 by moving the plate closer to the plane of the grate member. The plate may be moved so that the grate members move along the entry slots to move into the primary scraping slots 30. The plate may be shifted so that the grate members move toward one of the ends 32 of the scraping slot, and the plate may be moved so that the corresponding end edge portion 33 contacts the grate member. The plate may then be moved along the grate members to scrape the top and sides (or bottom and sides) of the grate members. Once the plate has been moved along substantially the entire length of the grate members, then the plate may be shifted or moved so the grate members move to the opposite ends 34 of the scraping slots, and the plate may be moved so that the corresponding end edge portion 35 contacts the grate member. The plate 12 may be moved along the grate members in the same direction as the first pass, or in the opposite direction of the first pass, so that the opposite surfaces of the grate members may be contacted by the end edge portions. The plate may then be moved so that the grate members move out of the primary scraping slots into the auxiliary entry slots and through the entry slots out of the primary side of the plate. The plate 12 may be moved along the grate members to scrape the top and sides of the several grate member rods with one pass and to scrape the bottom (and optionally, the sides) of the rods with a second pass, without need to remove the grates, nor reposition nor realign the tool for the second pass.

In an optional manner of usage, if the primary scraping slots are relatively short, it may be possible to scrap substantially all cross sectional surfaces of the grate members simultaneously by tilting the plate 12 from a perpendicular orientation to the plane of the grate members to simultaneously bring both of the end edge portions 33, 35 of a scraping slot 30 into contact with the opposite upper and lower surfaces of the grate members. The tilted or inclined plate may be moved along the grate members to scrape the top, bottom, and sides of the several grate member rods with one pass.

Optionally, as is generally illustrated in FIGS. 3A through 6, an embodiment 50 of the tool may have the plate formed with a pair of bends 52, 54 that form a jog 56 or undulation in the shape of the plate so that the plate has a pair of end portions 58, 60 that are oriented substantially parallel to each other. A medial portion 62 may extend between the end portions 58, 60 and the medial portion may be oriented substantially perpendicular to the end portions, or may be positioned at an angle less or greater than 90 degrees. In the illustrative embodiment, the end portions and the medial portion form a "Z" shape. The tool 50 may be engaged with the grill members by portioning the end portion 60 substantially parallel to the plane of the grill members, and moving the grill members 2 into respective entry gaps or slots 40 of the plate so that the plate may be moved closer to the grate members as the grate members move into the entry slots. The plate 12 may then be moved in a plane that is generally parallel to the plane of the grate members to move the grate members into the scraping slots, and the plate may be pivoted into an orientation in which the plane of the plate is angled with respect to the plane of the grill members. In some embodiments, the plate may be rotated with respect to the grate members through an angle of approximately 90 degrees to approximately 120 degrees (e.g., see FIGS. 3A through 6) to bring the end edge portions 33, 35 of a scraping slot into contact with a respective grate member at the same time, so that substantially the entire circumference of the grate member is contacted by an edge of the plate. The bends and resulting jog in the plate position the end edge portions on parallel but different (e.g., non-coplanar) planes. The planes of the end edge portions may be effectively positioned substantially perpendicular to the axis of the grate members to bring a substantial portion of each end edge portion of the scraping slot to bear on the surface of the respective grate member.

In other optional embodiments, a pair of plates may be connected together, with at least one of the plates being configured to guide the orientation of the other of the plates. The connecting structure may form a handle for the tool.

As a further option, one of the end edge portions may be made spring-loaded with a sufficiently stiff spring to scrape effectively, but not so stiff that it binds unnecessarily.

Figure 8:
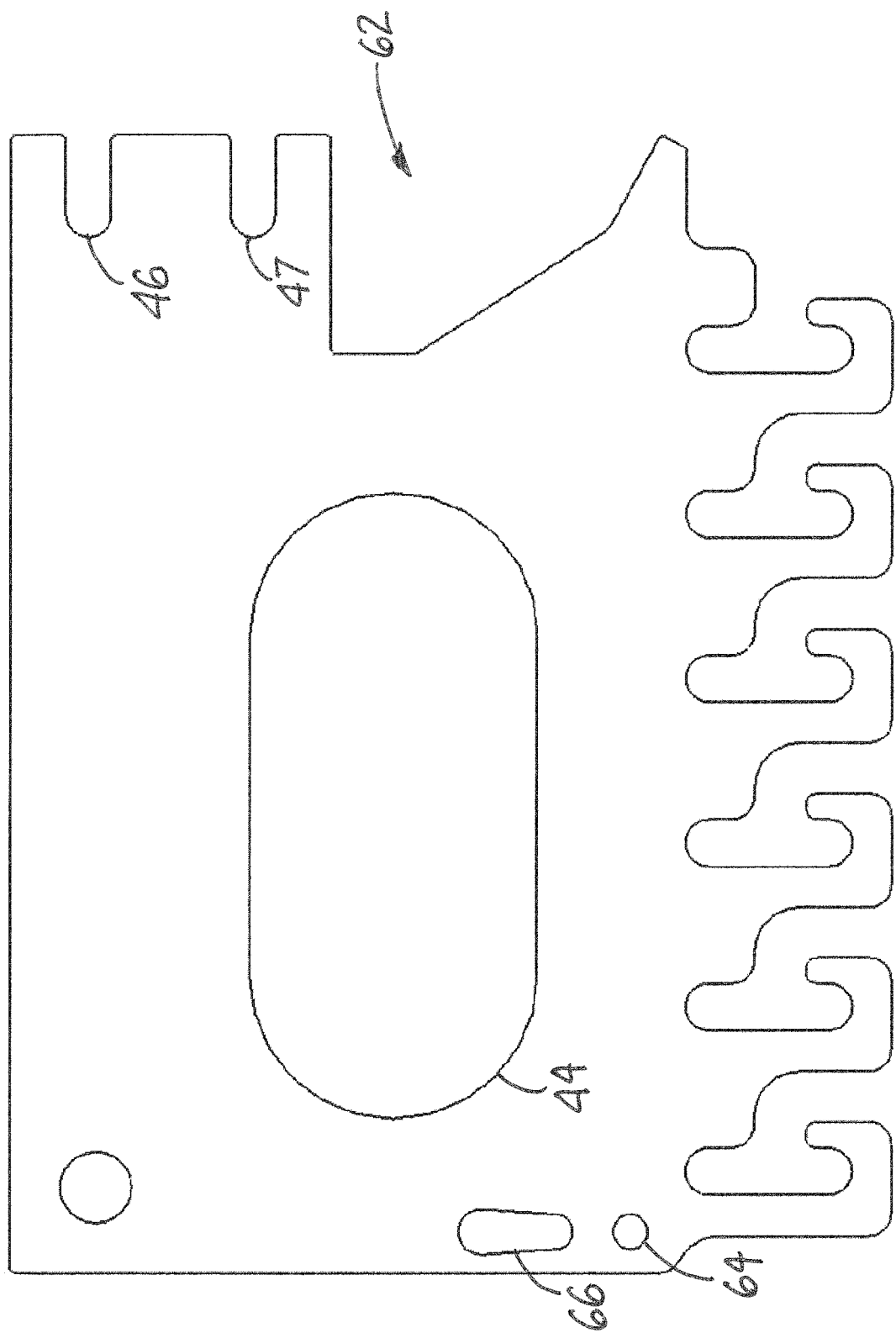
FIG. 8 is a schematic front view of another illustrative embodiment of the grate cleaning tool.
Figure 9:
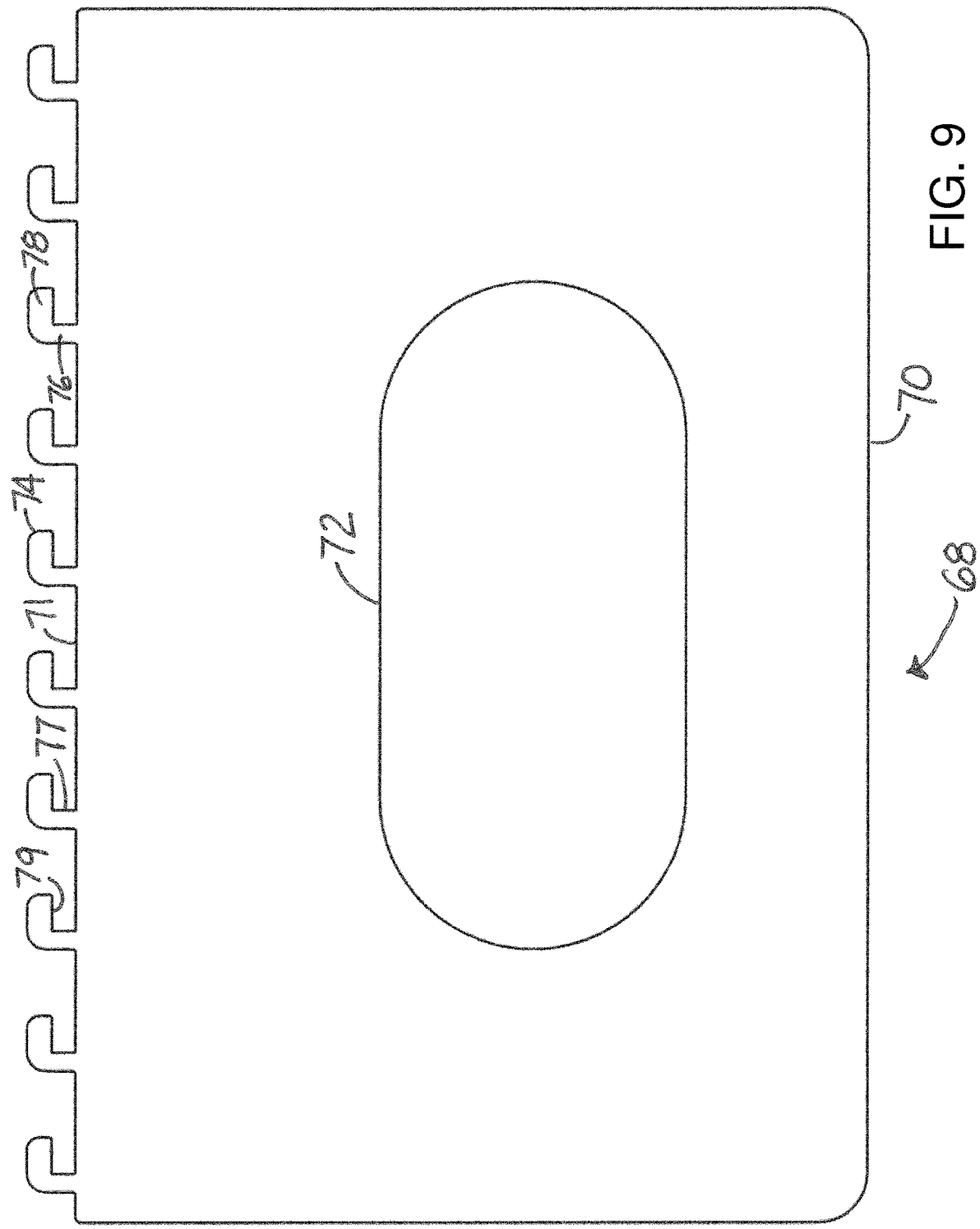
FIG. 9 is a schematic front view of another illustrative embodiment of a grate cleaning tool.
Figure 10:
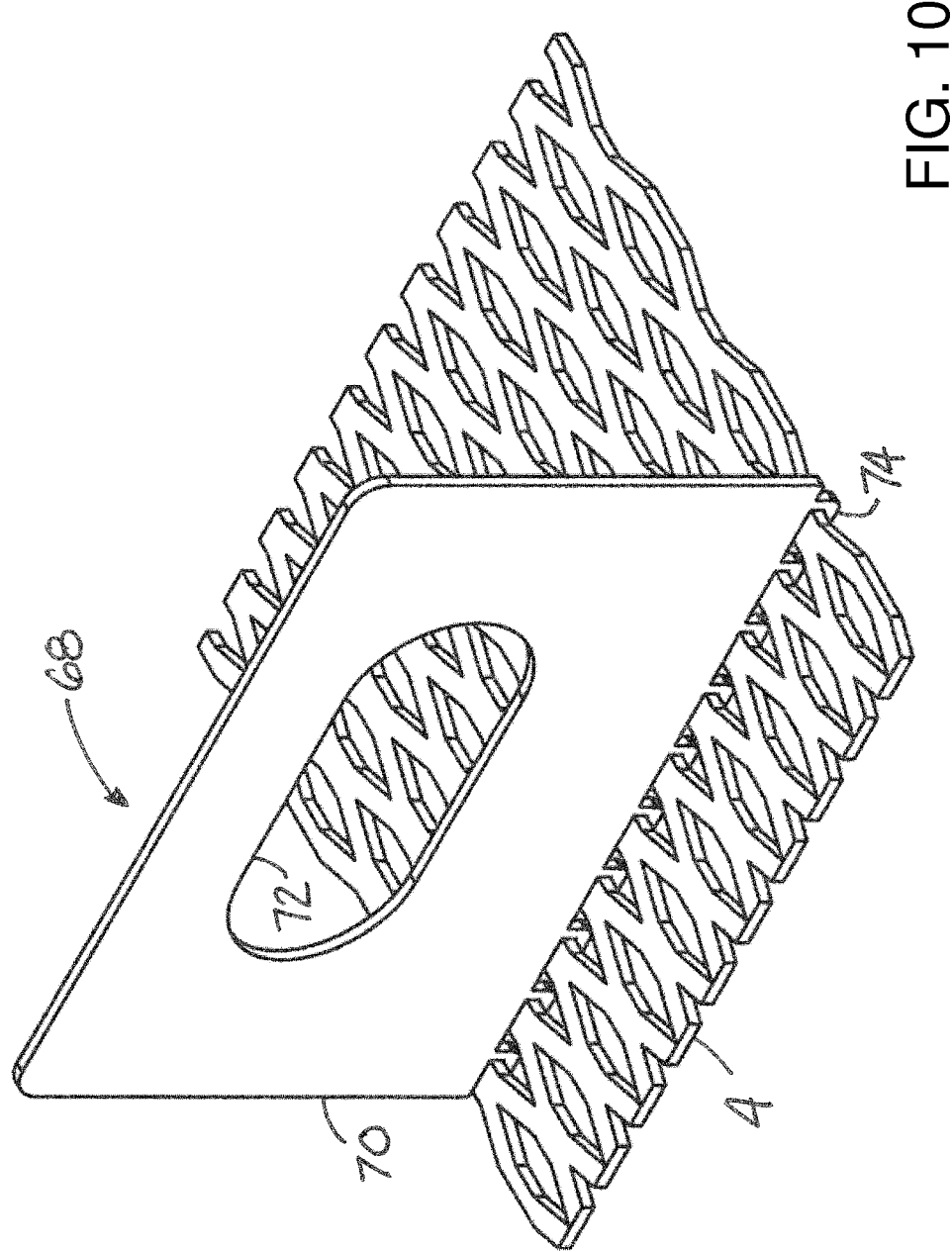
FIG. 10 is a schematic upper perspective view of the grate cleaning tool of FIG. 9 shown engaged with an expended metal grate for cleaning.
Figure 11:
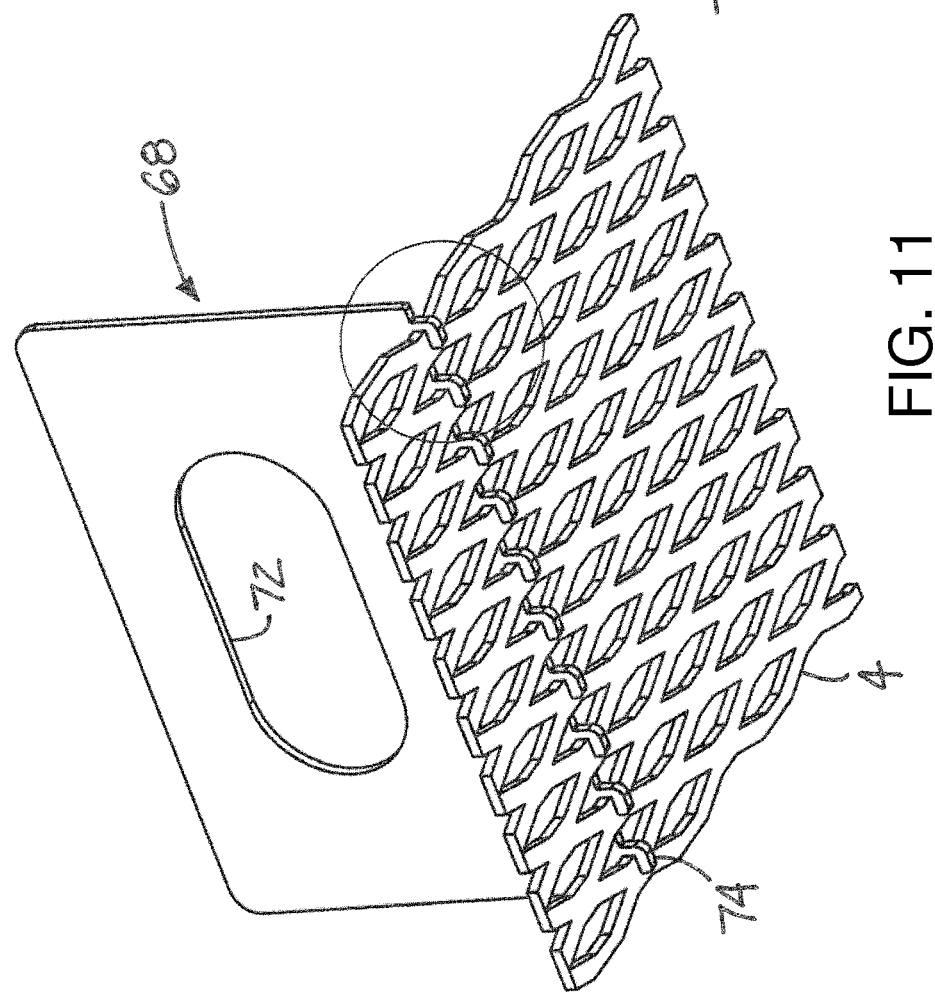
FIG. 11 is a schematic lower perspective view of the grate cleaning tool of FIG. 9 shown engaged with the expended metal grate for cleaning.
Figure 12:
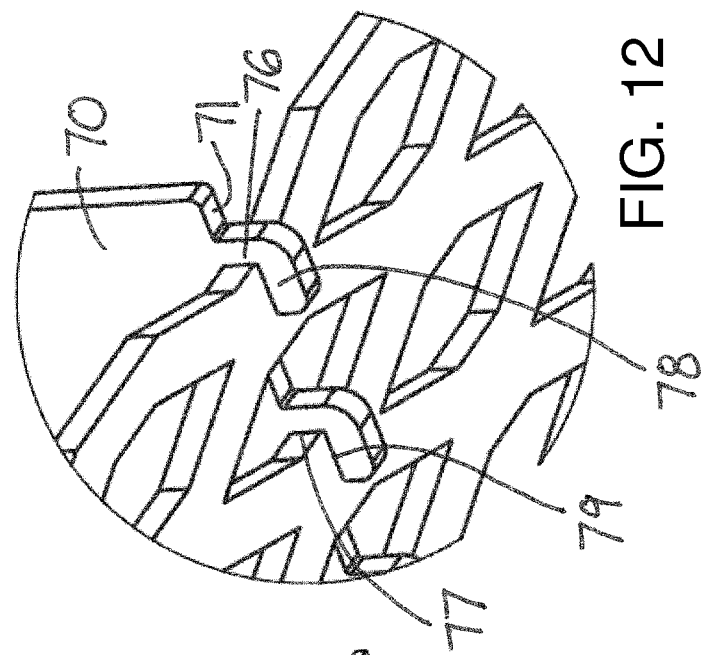
FIG. 12 is a schematic lower perspective view of an enlarged portion of the grate cleaning tool engaged with the grate as shown in FIG. 11.

FIG. 8 shows an embodiment of a grill cleaning tool 62 that includes many of the features described herein, and also includes additional features for cleaning a structure such as a temperature probe inserted into a food item being grilled for use in the cooking of the food. The features may include a substantially round cleaner hole 64 that is useful for receiving and cleaning the substantially cylindrical exterior surface of the temperature probe. The features may also include a cleaner slot 66 for cleaning the temperature probe, especially when the probe is particularly soiled. The slot 66 may comprise an elongated circular hole, and may have different diameters at the opposite ends of the slot to permit the probe to be moved within the slot to a position where the slot edges most closely engage the exterior surface of the probe. The scraping tool 62 may be bent and contoured in a manner that is similar to the embodiments shown in FIGS. 3 through 6.

Another embodiment of the grill cleaner tool 68 is shown in FIGS. 9 through 12 and is highly suitable for the cleaning of a grate 4 that is formed of expanded metal, or a metal sheet in which a series of parallel, offset slits are formed in the metal, and the metal is pulled in directions perpendicular to the extent of the slots such that slots of varying width are created in the sheet metal, with the slots having a substantially diamond shape. The tool 68 may have a main body 70 with a gripping aperture 72 formed there for receiving a portion of the hand of the user during use to permit gripping of the tool. The main body 70 may have an edge 71 which is useful for engaging and scraping the upper surface of the expanded metal grate. The tool 68 may have a plurality of scraping fingers 74 that extend from the edge 71 of the main body to extend through the slots of the expanded metal grate. The fingers 74 may be substantially uniformly spaced along a portion of the edge 71 of the main body, and may be of substantially uniform shape and size, although this is not critical.

Each of the fingers may have a first portion 76 that extends from the main body 70, and may have a first edge 77 that is oriented substantially perpendicular to the edge 71 from which the finger extends, and the first edge 77 may be useful for scraping edges of the expanded metal that define the slots in the metal. Each of the fingers may also include a second portion 78 that extends from an end of the first portion in a direction that is substantially perpendicular to the first portion 76. The second portion 78 may have a second edge 79 that is oriented substantially parallel to the edge 71 and which may be useful for scraping the lower surface of the expanded metal grate, or the surface opposite of the surface scraped by the edge 71. Optionally, a plurality of the tools 68 may be linked together in substantially parallel orientations to permit scraping a larger portion of the grate at one time.

In one manner of usage, the tool 68 may be brought close to the grate and the fingers 74 generally aligned with the slots in the expanded metal so that the fingers may be inserted into the slots. Once the fingers are inserted into the slots, the edge 71 may be used to scrape the upper surface of the grate. Simultaneously or subsequently to scraping the upper surface, the opposite edges on the first portion of the fingers may be contacted against the edges of the grate forming the slots to scrape debris from those edges. The edges of the second portions 78 of the fingers may be contacted against the lower surface of the grate, by lifting the edge 71 away from the upper surface of the grate if necessary, to scrape the lower surface. The steps may be repeated for additional sections of the grate.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A tool for cleaning cooking grates, the cooking grates including a plurality of substantially parallel grate members, the tool comprising:
    a plate having sides and an edge extending along each of the sides, the sides including a primary side with a primary side edge, portions of the primary side edge being substantially aligned along a primary extent with a primary extent axis;
    a plurality of elongated primary scraping slots formed in the plate, the scraping slots being formed by the primary side edge, the primary scraping slots having end portions with each end portion being elongated along an end portion axis, the end portions being closed, each of the scraping slots including end edge portions forming ends of the end portions of the scraping slots, each of the scraping slots having side edge portions forming sides of the scraping slots;
    a plurality of auxiliary entry slots configured to permit movement of grate members into the primary scraping slots, at least one of the entry slots being in communication with a said scraping slot and the primary side, a said entry slot intersecting a said primary scraping slot, the auxiliary entry slots extending substantially perpendicular to the primary extent axis of the primary extent of the primary side edge;
    wherein the end edge portions of the primary scraping slots are similarly shaped such that each end edge portion is able to scrape an opposite surface of the grate members without removing the grate member from the primary scraping slot;
    wherein the end portion axis of each of the end portions of the primary scraping slots being oriented substantially perpendicular to the primary extent axis of the primary extent of the primary side edge such that movement of a said grate member into contact with each of the end edge portions of a said primary scraping slot occurs in a direction oriented substantially perpendicular to primary extent axis of the primary extent; and
    wherein a said primary scraping slot is elongated along a first axis and an associated said auxiliary entry slot is elongated along a second axis, the first axis and the second axis being oriented substantially parallel to each other and extending substantially perpendicular to the primary extent axis of the primary extent of the primary side edge.

2. The tool of claim 1 wherein the plurality of primary scraping slots comprises at least three scraping slots.

3. The tool of claim 1 wherein the end edge portions are configured to contact at least about 45% of the cross sectional exterior surface of the grate members.

4. The tool of claim 1 wherein each of the end edge portions of a primary scraping slot is semi-circular in shape.

5. The tool of claim 1 wherein the side edge portions of a primary scraping slot are oriented substantially parallel to each other, and the scraping slots are oriented substantially parallel to each other.

6. The tool of claim 1 additionally comprising a gripping aperture formed in the plate and configured to receive a portion of a hand of the user, the gripping aperture being elongated along an axis oriented substantially parallel to the primary extent axis of the primary extent of the primary side edge.

7. The tool of claim 1 additionally comprising at least one secondary scraping slot located at the secondary side of the plate and being formed by the secondary side edge.

8. The tool of claim 1 additionally comprising a secondary scraping contour configured to scrape a surface, the secondary scraping contour being positioned along the secondary side and being formed by the second side edge with a linear portion.

9. The tool of claim 1 wherein the side edge portions of the primary scraping slots extend substantially perpendicular to the primary extent axis of the primary extent of the primary side edge.

* * * * *